(12) United States Patent
Takano et al.

(10) Patent No.: US 9,086,602 B2
(45) Date of Patent: Jul. 21, 2015

(54) LIQUID CRYSTAL DISPLAY DEVICE

(75) Inventors: Keisuke Takano, Saitama-ken (JP); Jin Hirosawa, Saitama-ken (JP); Arihiro Takeda, Saitama-ken (JP); Hirokazu Morimoto, Saitama-ken (JP)

(73) Assignee: Japan Display Inc., Tokyo (JP)

( * ) Notice: Subject to any disclaimer, the term of this patent is extended or adjusted under 35 U.S.C. 154(b) by 158 days.

(21) Appl. No.: 13/546,655

(22) Filed: Jul. 11, 2012

(65) Prior Publication Data

US 2013/0057815 A1    Mar. 7, 2013

(30) Foreign Application Priority Data

Sep. 1, 2011    (JP) ................................. 2011-190945

(51) Int. Cl.
*G02F 1/1343* (2006.01)
*G02F 1/1337* (2006.01)

(52) U.S. Cl.
CPC ............ *G02F 1/134309* (2013.01); *G02F 2001/133742* (2013.01); *G02F 2001/134318* (2013.01); *G02F 2001/134381* (2013.01)

(58) Field of Classification Search
CPC ............ G02F 1/134309; G02F 2001/134381
USPC ............... 349/123, 167, 170, 139, 143, 39
See application file for complete search history.

(56) References Cited

U.S. PATENT DOCUMENTS

| | | | |
|---|---|---|---|
| 6,266,116 B1 | 7/2001 | Ohta et al. | |
| 6,388,727 B1 * | 5/2002 | Kim et al. | 349/141 |
| 6,549,258 B1 * | 4/2003 | Shin et al. | 349/141 |
| 6,924,863 B2 * | 8/2005 | Nishida et al. | 349/141 |
| 2001/0010575 A1 * | 8/2001 | Yoshida et al. | 349/141 |
| 2002/0024627 A1 * | 2/2002 | Sakamoto et al. | 349/141 |

(Continued)

FOREIGN PATENT DOCUMENTS

| | | |
|---|---|---|
| JP | 6-222397 | 8/1994 |
| JP | 7-159807 | 6/1995 |

(Continued)

OTHER PUBLICATIONS

U.S. Appl. No. 13/425,779, filed Mar. 21, 2012, Takano, et al.

(Continued)

*Primary Examiner* — Edward Glick
*Assistant Examiner* — Sang V Nguyen
(74) *Attorney, Agent, or Firm* — Oblon, McClelland, Maier & Neustadt, L.L.P.

(57) ABSTRACT

In one embodiment, a first substrate includes a main pixel electrode and a first alignment film formed on the main pixel electrode having vertical alignment characteristics. A second substrate includes a pair of main common electrodes and a second alignment film formed on the main common electrodes having vertical alignment characteristics. A liquid crystal layer is held between the first substrate and the second substrate having positive dielectric anisotropy. The main pixel electrode is arranged extending in a first direction. The pair of main common electrodes is arranged in the first direction, respectively, so as to sandwich the main pixel electrode.

8 Claims, 13 Drawing Sheets

(56) References Cited

U.S. PATENT DOCUMENTS

| | | | |
|---|---|---|---|
| 2003/0112393 A1* | 6/2003 | Watanabe et al. | 349/123 |
| 2004/0135773 A1* | 7/2004 | Bang et al. | 345/173 |
| 2004/0165136 A1 | 8/2004 | Sugiyama et al. | |
| 2005/0062924 A1* | 3/2005 | Ahn et al. | 349/143 |
| 2005/0200786 A1* | 9/2005 | Watanabe et al. | 349/138 |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2008/0055495 A1* | 3/2008 | Cernasov | 349/12 |
| 2008/0062358 A1 | 3/2008 | Lee et al. | |
| 2008/0180590 A1* | 7/2008 | Lee et al. | 349/39 |
| 2008/0180623 A1 | 7/2008 | Lee et al. | |
| 2008/0186439 A1 | 8/2008 | Kwon et al. | |
| 2008/0284967 A1* | 11/2008 | Oh et al. | 349/144 |
| 2009/0225246 A1* | 9/2009 | Shoraku et al. | 349/39 |
| 2010/0225869 A1* | 9/2010 | Ahn et al. | 349/147 |
| 2010/0245273 A1* | 9/2010 | Hwang et al. | 345/173 |
| 2011/0122084 A1* | 5/2011 | Jeon et al. | 345/173 |
| 2011/0176100 A1* | 7/2011 | Nishida et al. | 349/143 |
| 2011/0227487 A1* | 9/2011 | Nichol et al. | 315/158 |
| 2011/0317118 A1* | 12/2011 | Okazaki et al. | 349/141 |
| 2012/0182509 A1 | 7/2012 | Takano et al. | |

FOREIGN PATENT DOCUMENTS

| | | | |
|---|---|---|---|
| JP | 9-160041 | | 6/1997 |
| JP | 9-160042 | | 6/1997 |
| JP | 9-160061 | | 6/1997 |
| JP | 10-26765 | | 1/1998 |
| JP | 10-90708 | | 4/1998 |
| JP | 10-232392 | * | 9/1998 |
| JP | 2000-081641 | | 3/2000 |
| JP | 2000-122082 | | 4/2000 |
| JP | 2005-3802 | | 1/2005 |
| JP | 3644653 | | 2/2005 |
| JP | 2005-242307 | | 9/2005 |
| JP | 2009-192822 | | 8/2009 |

OTHER PUBLICATIONS

U.S. Appl. No. 13/542,049, filed Jul. 5, 2012, Takeda, et al.
U.S. Appl. No. 13/562,647, filed Jul. 31, 2012, Takeda, et al.
U.S. Appl. No. 13/548,919, filed Jul. 13, 2012, Hirosawa.
Office Action issued Mar. 24, 2015, in Japanese Patent Application No. 2011-190945 (English Language).

* cited by examiner

LIQUID CRYSTAL DISPLAY DEVICE

CROSS-REFERENCE TO RELATED APPLICATION

This application is based upon and claims the benefit of priority from prior Japanese Patent Application No. 2011-190945, filed Sep. 1, 2011, the entire contents of which are incorporated herein by reference.

FIELD

Embodiments described herein relate generally to a liquid crystal display device.

BACKGROUND

The liquid crystal display device as a flat display panel is used for a large-screen TV, PC (personal computer), FA (factory automation) apparatus, OA (office automation) apparatus, a car-navigation system, a cellular phone, a smart phone, and a tablet PC, etc. As display modes of the liquid crystal display device, MVA (Multi-domain Vertical Alignment) mode and FFS (Fringe Field Switching) mode are developed. The display performance of the liquid crystal display device has been improved.

In the liquid crystal display device using the MVA mode, it is easy to obtain a uniform display with a high contrast over the large screen, and the transmissivity is comparatively higher compared with the liquid crystal display device using the FFS mode. For this reason, the liquid crystal display device in the MVA mode is commonly used from a large-screen TV to small size mobile uses, such as a cellular phone. In the liquid crystal display device using the MVA mode, an initial alignment direction of liquid crystal molecules is set to a vertical alignment direction.

By the way, in the liquid crystal display device using the MVA mode, the liquid crystal molecule is switched using n type liquid crystal material in order to make electric field act substantially in the vertical direction almost perpendicular to planes of an array substrate and a counter substrate. In a polar angle and an angle of direction which specify an alignment direction of the liquid crystal molecule, n type liquid crystal material can specify only the polar angle by electric field. For this reason, in the liquid crystal display device using the MVA mode, there is a problem that a regulation strength for alignment of the liquid crystal molecule is weak. If the regulation strength for alignment is weak, when pressure is applied, for example, from exterior, it becomes easy to generate alignment disorder of the liquid crystal molecule, which is called polling.

On the other hand, in p type liquid crystal material, the liquid crystal molecule operates in a parallel direction to the electric field, and both the polar angle and the angle of direction can be specified by electric field. Since the regulation strength for alignment of the liquid crystal molecule is large, there is a feature that the polling is not generated easily.

The liquid crystal display devices using the IPS (In-Plane Switching) mode and the FFS (Fringe Field Switching) mode use p type liquid crystal material. However, the liquid crystal display device using the IPS mode and the FFS mode has a problem that it is difficult to specify the polar angle since the liquid crystal molecules are driven in the directions along the planes of the array substrate and the counter substrate by lateral electric field. For this reason, if the regulation strength for alignment becomes weak, and, for example, the external pressure is applied, it becomes easy to generate the polling.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Figure 1:
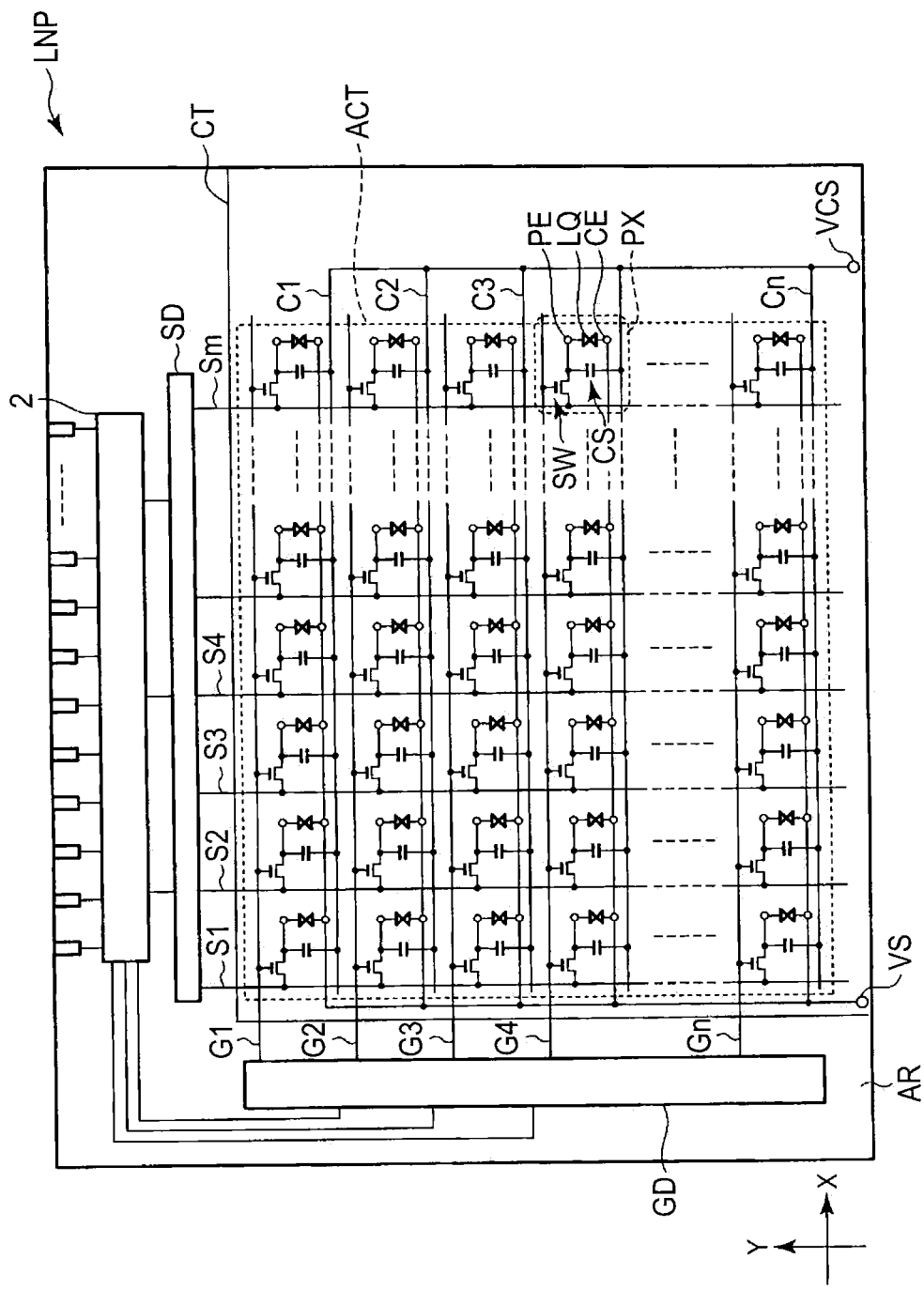
FIG. 1 is a figure schematically showing a structure and the equivalent circuit of a liquid crystal display device according to a first embodiment.

A liquid crystal display device according to an exemplary embodiment of the present invention will now be described with reference to the accompanying drawings wherein the same or like reference numerals designate the same or corresponding parts throughout the several views.

According to one embodiment, a liquid crystal display device having a plurality of pixels includes: a first substrate including a main pixel electrode and a first alignment film formed on the main pixel electrode having vertical alignment characteristics; a second substrate including a pair of first main common electrodes and a second alignment film formed on the first main common electrodes having vertical alignment characteristics; and a liquid crystal layer held between the first substrate and the second substrate having positive dielectric anisotropy; wherein the main pixel electrode is arranged in a first direction extending in a second direction orthogonally crossing the first direction; and the first main common electrodes are arranged in the first direction extending in the second direction, respectively, so as to sandwich the main pixel electrode.

In other embodiment, a liquid crystal display device having a plurality of pixels includes: a first substrate including; a pair of source lines arranged in a first direction and extending in a second direction orthogonally crossing the first direction, a pair of gate lines arranged in the second direction and extending in the first direction, a pair of first main common electrodes formed on the source lines, respectively, a main pixel electrode extending in the second direction and sandwiched by the pair of first main common electrodes, a first alignment film formed on the main pixel electrode and the first main common electrodes having vertical alignment characteristics, a second substrate including; a pair of second main common electrodes arranged above the first main common electrodes, respectively, a second alignment film formed on the second main common electrodes having vertical alignment characteristics, and a liquid crystal layer held between the first substrate and the second substrate and having positive dielectric anisotropy.

FIG. 1 is a figure schematically showing a structure and an equivalent circuit of the liquid crystal display device according to one embodiment. The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer held between the array substrate AR and the counter substrate CT. The liquid crystal display panel LPN includes an active area ACT which displays images. The active area ACT is constituted by a plurality of pixels PX arranged in the shape of a (m×n) matrix (here, "m" and "n" are positive integers).

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C extend in a first direction, respectively. The gate line G and the auxiliary capacitance line C are arranged in turns along a second direction Y that orthogonally intersects the first direction X. The source lines S cross the gate line G and the capacitance line C. The source lines S extend linearly in the second direction Y, respectively. The gate line G, the auxiliary capacitance line C and the source lines S do not necessarily extend linearly, and a portion thereof may be crooked partially.

Each gate line G is pulled out to outside of the active area ACT, and is connected to a gate driver GD. Each source line S is pulled out to the outside of the active area ACT, and is connected to a source driver SD. At least a portion of the gate driver GD and the source driver SD is formed in the array substrate AR, for example, and the gate driver GD and the source driver SD are connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE. The auxiliary capacitance line C is electrically connected with a voltage impressing portion VCS to which the auxiliary capacitance voltage is impressed.

In addition, in the liquid crystal display panel LPN according to this embodiment, while the pixel electrode PE is formed in the array substrate AR, at least one portion of the common electrode CE is formed in the counter substrate CT. Liquid crystal molecules of the liquid crystal layer LQ are switched mainly using an electric field formed between the pixel electrode PE and the common electrode CE. The electric field formed between the pixel electrode PE and the common electrode CE is a lateral electric field substantially in parallel with the principal surface of the array substrate AR or the principal surface of the counter substrate CT, or an oblique electric field slightly oblique with respect to the principle surfaces of the substrate.

The switching element SW is constituted by an n channel type thin film transistor (TFT), for example. The switching element SW is electrically connected with the gate line G and the source line S. The (m×n) switching elements SW are formed in the active area ACT. The switching element SW may be either a top-gate type or a bottom-gate type. Though the semiconductor layer is formed of poly-silicon, the semiconductor layer may be formed of amorphous silicon.

The pixel electrode PE is arranged in each pixel and electrically connected with the switching element SW. The common electrode CE is arranged in common to the plurality of pixel electrodes PE through the liquid crystal layer LQ. Though the pixel electrode PE and the common electrode CE are formed by light transmissive conductive materials, such as Indium Tin Oxide (ITO), Indium Zinc Oxide (IZO), etc., other metals such as aluminum may be used.

The array substrate AR includes an electric power supply portion VS formed outside of the active area ACT. Furthermore, the common electrode CE is drawn to outside of the active area ACT and electrically connected with an electric power supply portion VS formed in the array substrate AR through an electric conductive component which is not illustrated.

Figure 2:
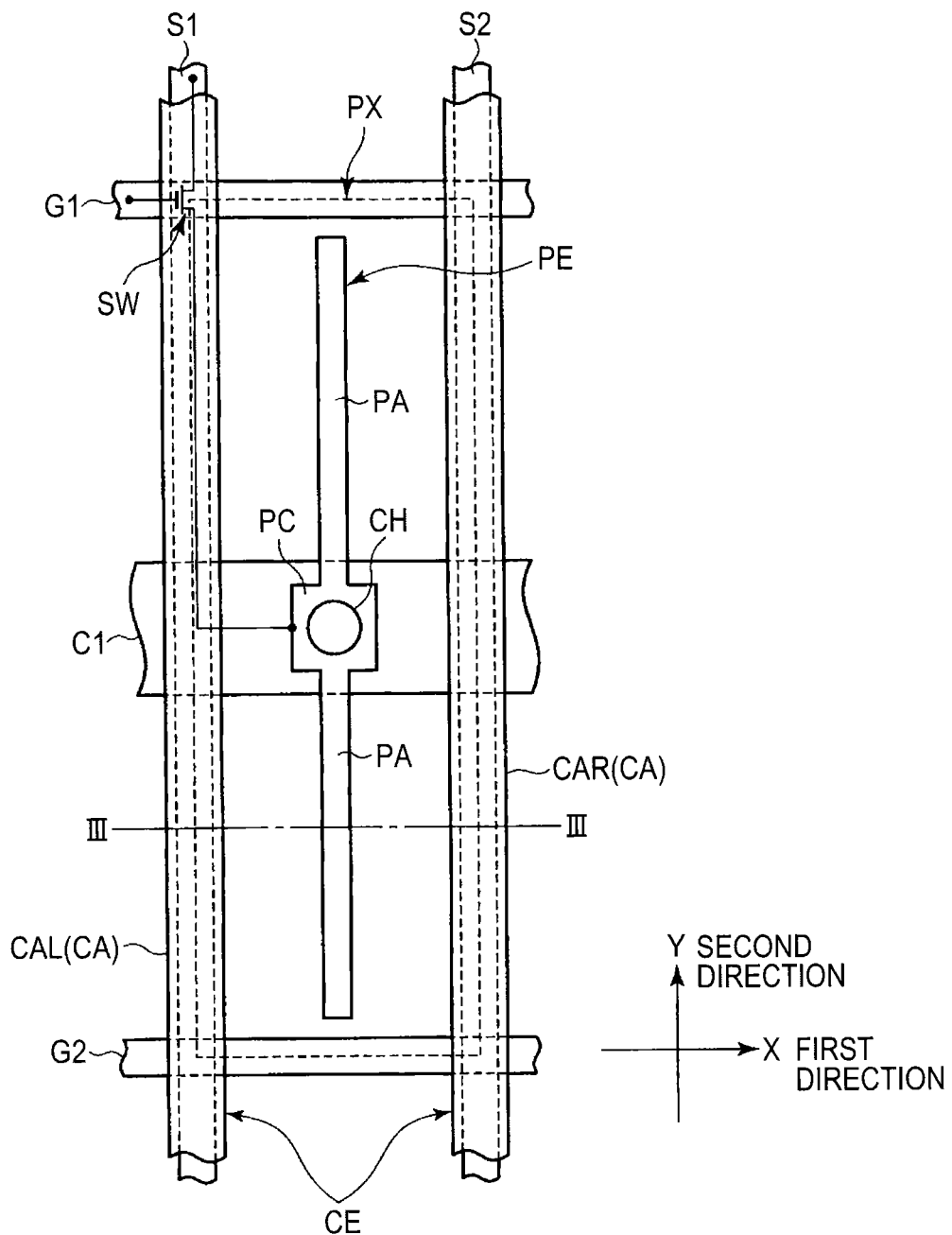
FIG. 2 is a plan view schematically showing a structure of one pixel when the liquid crystal display panel shown in FIG. 1 is seen from the counter substrate side.

FIG. 2 is a plan view schematically showing the structure of one pixel when the liquid crystal display panel according to one embodiment is seen from the counter substrate side. Herein, a plan view in a X-Y plane specified in the first direction X and the second direction Y is shown.

As shown in FIG. 2, the pixel PX has the shape of a rectangle whose length in the first direction X is shorter than the length in the second direction Y, as shown in a dashed line. The gate line G1 and the gate line G2 extend along the first direction X. The auxiliary capacitance line C1 is arranged between the adjoining gate line G1 and gate line G2, and extends along the first direction X. The source line S1 and the source line S2 extend along the second direction Y. The pixel electrode PE is arranged between the adjoining source line S1 and source line S2. Moreover, the pixel electrode PE is located between the gate line G1 and the gate line G2.

In the illustrated example, the source line S1 is arranged at the left-hand side end in the pixel PX. Precisely, the source line S1 is arranged striding over a boundary between the illustrated pixel and a pixel PX adjoining the illustrated pixel PX on the left-hand side. The source line S2 is arranged at the right-hand side end. Precisely, the source line S2 is arranged striding over a boundary between the illustrated pixel and a pixel PX adjoining the illustrated pixel PX on the right-hand side. Moreover, in the pixel PX, the gate line G1 is arranged at an upper end portion. Precisely, the gate line G1 is arranged striding over a boundary between the illustrated pixel and a pixel which adjoins the illustrated pixel PX on its upper end side. The gate line G2 is arranged at a lower end portion. Precisely, the gate line G2 is arranged striding over a boundary between the illustrated pixel and a pixel which adjoins the illustrated pixel PX on its lower end side. The auxiliary capacitance line C1 is arranged approximately in a central portion of the pixel PX.

The switching element SW is electrically connected with the gate line G1 and the source line S1 in the illustrated example. Namely, the switching element SW is formed in an intersection of the gate line G1 with the source line S1. A drain line extends along the source line S1 and the auxiliary capacitance line C1, and is electrically connected with the pixel electrode PE through a contact hole CH formed in a region which overlaps with the auxiliary capacitance line C1. The switching element SW is formed in the overlapped region with the source line S1 and the auxiliary capacitance line C1 and hardly runs off the overlapped region. Thereby, reduction of the area of an aperture which contributes to a display is suppressed when the switching element SW is arranged in the pixel PX.

The pixel electrode PE is equipped with a main pixel electrode PA and a contact portion PC electrically connected each other. The main pixel electrode PA linearly extends from the contact portion PC to a vicinity of an upper end and a vicinity of a bottom end of the pixel PX along the second direction Y. The main pixel electrode PA is formed in the shape of a belt, and has the same width along the first direction X. The contact portion PC is located in a region which overlaps with the auxiliary capacitance line C1, and is electrically connected with the switching element SW through a contact hole CH. The contact portion PC is formed more broadly than the main pixel electrode PA.

The pixel electrode PE is arranged approximately in a central position between the source line S1 and the source line S2, i.e., the center of the pixel PX. The distance between the source line S1 and the pixel electrode PE in the first direction X is substantially equal to that between the source line S2 and the pixel electrode PE in the first direction X.

The common electrode CE is equipped with a main common electrode CA. The main common electrodes CA are arranged on both sides which sandwich the main pixel electrode PA extending linearly along the second direction Y substantially in parallel with the pixel electrode PA in the X-Y plane. While the main common electrodes CA counter with the source lines S, respectively, the main common electrodes CA extend substantially in parallel with the main pixel electrode PA. The main common electrodes CA are formed in the shape of a belt, and have the substantially same width along the first direction X.

In the illustrated example, the main common electrodes CA are arranged at right-and-left both ends of the pixel PX, respectively, in two lines in parallel along the first direction X. Hereinafter, in order to distinguish the two lines, the main common electrode CA of the left-hand side in the figure is called CAL, and the main common electrode of the right-hand side in a figure is called CAR. The main common electrode CAL counters with the source line S1, and the main common electrode CAR counters with the source line S2. In the active area ACT or outside of the display area, the main common electrodes CAL and the main common electrode CAR are electrically connected each other.

In the pixel PX, the main common electrode CAL is arranged at the left-hand side end. Precisely, the main common electrode CAL is arranged striding over a boundary between the illustrated pixel and a pixel which adjoins the illustrated pixel PX on the left-hand side. The main common electrode CAR is arranged at the right-hand side end. Precisely, the main common electrode CAR is arranged striding over a boundary between the illustrated pixel and a pixel which adjoins the illustrated pixel PX on the right-hand side.

If its attention is paid to the positional relationship between the pixel electrode PE and the main common electrode CA, the pixel electrode PE and the main common electrode CA are arranged by turns along the first direction X. The pixel electrodes PE and the main common electrode CA are arranged substantially in parallel each other. At this time, none of the main common electrodes CA overlaps with the pixel electrode PE in the X-Y plane.

One pixel electrode PE is located between the adjoining main common electrode CAL and the main common electrode CAR. The main common electrode CAL and the main common electrode CAR are arranged on the both sides which face across the position right above the pixel electrode PE. The pixel electrode PE is arranged between the main common electrode CAL and the main common electrode CAR. For this reason, the main common electrode CAL, the main pixel electrode PE, and the main common electrode CAR are arranged along the first direction X in this order.

The inter-electrode distance between the main common electrode CAL and the pixel electrode PE in the first direction X is substantially the same as that between the main common electrode CAR and the pixel electrode PE in the first direction X.

Figure 3:
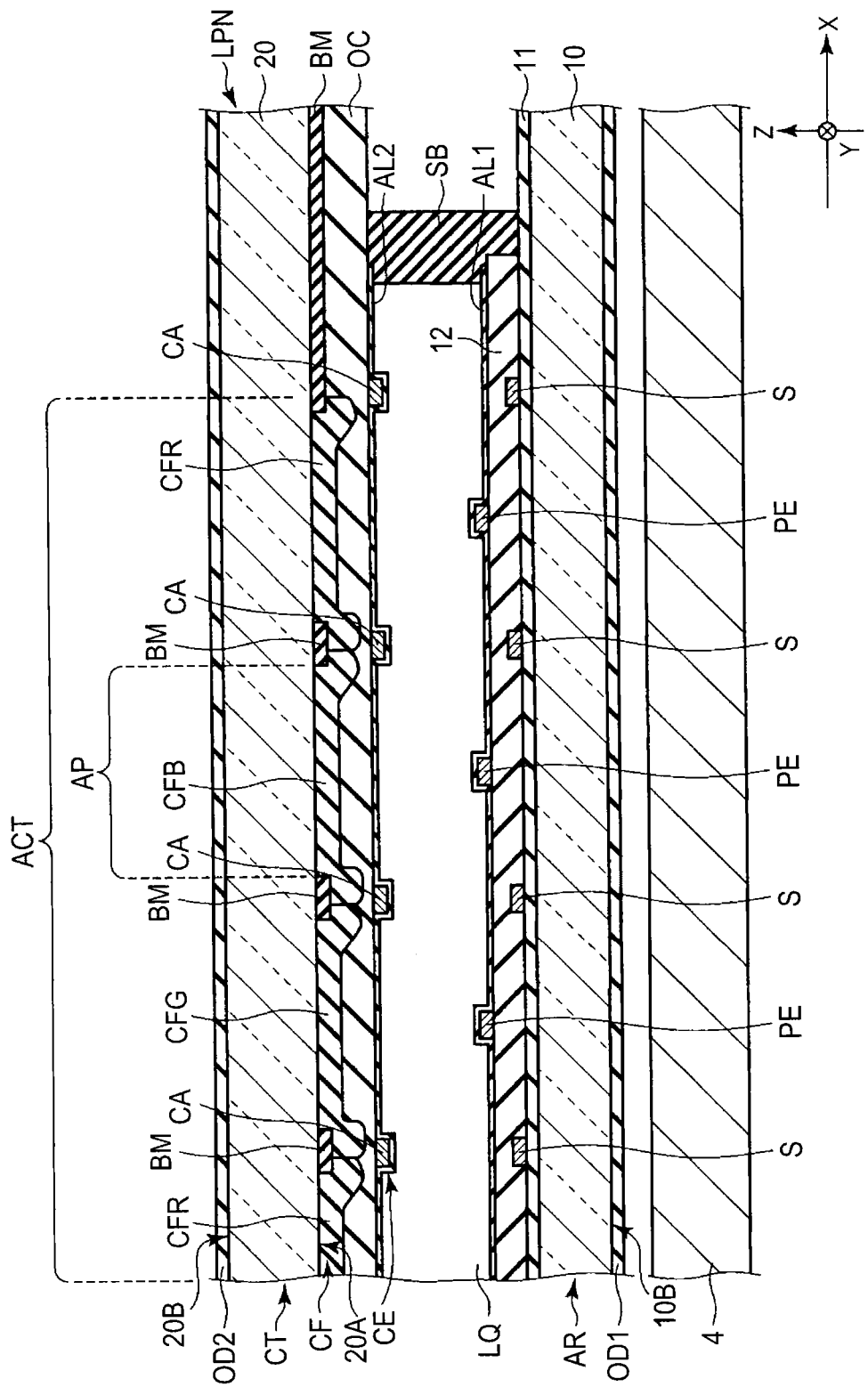
FIG. 3 is a cross-sectional view schematically showing the structure taken along line III-III in the liquid crystal display panel shown in FIG. 2.

FIG. 3 is a cross-sectional view schematically showing a cross-sectional structure taken along line III-III in the liquid crystal display panel LPN shown in FIG. 2. In addition, only a portion required for explanation is illustrated here. The backlight 4 is arranged on the back side of the array substrate AR in the illustrated example. Various types of backlights 4 can be used. For example, a light emitting diode (LED) or a cold cathode fluorescent lamp (CCFL), etc., can be applied as a light source of the backlight 4, and the explanation about its detailed structure is omitted.

The array substrate AR is formed using a first insulating substrate 10 which has a transmissive characteristics. The source line S is formed on a first interlayer insulating film 11, and is covered with a second interlayer insulating film 12. In addition, the gate line and the auxiliary capacitance line which are not illustrated are arranged between the first insulating substrate 10 and the first interlayer insulating film 11, for example. The pixel electrode PE is formed on the second interlayer insulating film 12. The pixel electrode PE is located inside of the pixel rather than the position on the respective adjoining source lines S.

A first alignment film AL1 is arranged on the array substrate AR facing the counter substrate CT, and extends to whole active area ACT. The first alignment film AL1 covers the pixel electrode PE, etc., and is arranged also on the second interlayer insulating film 12. The first alignment film AL1 is formed of the material which shows a vertical alignment characteristics. In addition, the array substrate AR may be further equipped with a portion of the common electrodes CE.

The counter substrate CT is formed using a second insulating substrate 20 which has a transmissive characteristics. The counter substrate CT includes a black matrix BM, a color filter CF, an overcoat layer OC, the common electrode CE, and a second alignment film AL2, etc.

The black matrix BM is formed on the second insulating substrate 20 defining each pixel PX, and forms an aperture portion AP. That is, the black matrix BM is arranged so that line portions, such as the source line, the gate line, the auxiliary capacitance line, and the switching element, may counter the black matrix BM. Herein, though only a portion of the black matrix BM extending along the second direction Y is shown, the black matrix BM may includes a portion extending along the first direction X. The black matrix BM is formed an internal surface 20A of the second insulating substrate 20 facing the array substrate AR.

A color filter CF is arranged corresponding to each pixel PX. That is, while the color filter CF is arranged in the aperture portion AP in the internal surface 20A of the second insulating substrate 20, a portion thereof runs on the black matrix BM. The colors of the color filters CF arranged in adjoining pixels PX in the first direction X differ mutually. For example, the color filters CF are formed of resin materials colored by three primary colors of red, blue, and green, respectively. The red color filter CFR formed of resin material colored in red is arranged corresponding to the red pixel. The blue color filter CFB formed of resin material colored in blue is arranged corresponding to the blue pixel. The green color filter CFG formed of resin material colored in green is arranged corresponding to the green pixel. The boundary between the adjoining color filters CF is located in a position which overlaps with the black matrix BM.

The overcoat layer OC covers the color filter CF. This overcoat layer OC eases influence of concave-convex of the surface of the color filter CF. The common electrode CE is formed on the overcoat layer OC facing the array substrate AR.

The second alignment film AL2 is arranged on the counter substrate CT facing the array substrate AR, and extends to whole active area ACT. The second alignment film AL2 covers the common electrode CE, the overcoat layer OC, etc. The second alignment film AL2 shows vertical alignment characteristics.

The first alignment film AL1 and the second alignment film AL2 can be formed before or after attaching the array substrate AR and the counter substrate CT. They can be formed using generally known technique. For example, the first alignment film AL1 and the second alignment film AL2 can be formed by forming the vertical alignment film on the substrate before attaching the array substrate AR with the counter substrate CT. Moreover, by adding a monomer into the liquid crystal material, the first alignment film AL1 and the second alignment film AL2 can also be formed after attaching the array substrate AR and the counter substrate CT.

The first alignment film AL1 and the second alignment film AL2 initially align the liquid crystal molecule of the liquid crystal layer LQ in a third direction Z. Here, the third direction Z is a direction perpendicular to the plane of the array substrate AR and the counter substrate CT, and intersects perpendicularly the first direction X and the second direction Y.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 2-7 μm cell gap, is formed, for example. The array substrate AR and the counter substrate CT are pasted together by seal material which is not illustrated, in which the predetermined cell gap is formed.

The liquid crystal layer LQ is held at the cell gap formed between the array substrate AR and the counter substrate CT, and is arranged between the first alignment film AL1 and the second alignment film AL2. The liquid crystal layer LQ contains the liquid crystal molecule which is not illustrated. The liquid crystal layer LQ is constituted by positive type liquid crystal material. The liquid crystal layer LQ is formed of a vertical alignment type liquid crystal material.

In addition, the main common electrodes CA located above the source lines S counter with the black matrix BM, respectively, and have the width equal to or less than the black matrix BM in the first direction X. Accordingly, the main common electrode CA does not extend beyond an overlapped portion with the black matrix BM to the pixel electrode PE side. For this reason, the opening which contributes to a display corresponds to a region between the pixel electrode PE and the main common electrode CA in the regions between the adjoining black matrixes BM or between the adjoining source lines S.

Figure 4:
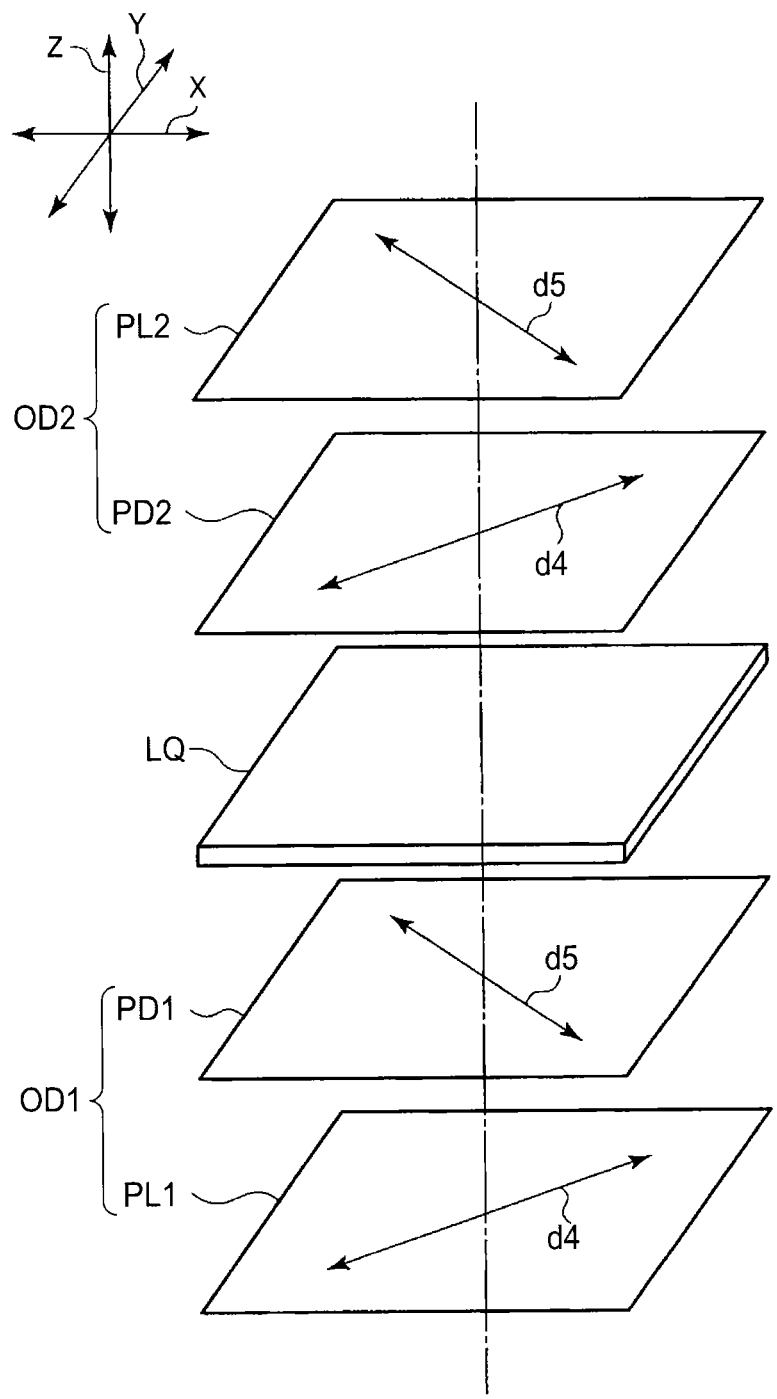
FIG. 4 is an exploded perspective view showing a portion of the liquid crystal display panel, and is a figure showing an absorption axis of a polarizing plate, and a slow axis of a retardation film.

FIG. 4 is an exploded perspective view showing a portion of the above-mentioned liquid crystal display panel LPN, and is a figure showing an absorption axis of a polarizing plate and a slow axis of a retardation film. As shown in FIG. 3 and FIG. 4, a first optical element OD1 is attached on an external surface 10B of the array substrate AR, i.e., the external surface of the first insulating substrate 10 which constitutes the array substrate AR, by adhesives, etc. The first optical element OD1 is located in a side which counters with the back-light unit 4 of the liquid crystal display panel LPN, and controls the polarization state of the incident light which enters into the liquid crystal display panel LPN from the back light unit 4.

A second optical element OD2 is attached on an external surface 20B of the counter substrate CT, i.e., the external surface of the second insulating substrate 20 which constitutes the counter substrate CT, by adhesives etc. The second optical element OD2 is located in a display surface side of the liquid crystal display panel LPN, and controls the polarization state of emitted light from the liquid crystal display panel LPN.

The first optical element OD1 is formed by a first polarizing plate PL1 which counters the external surface of the first insulating substrate 10 and a first retardation film PD1 which are located between the first insulating substrate 10 and the first polarizing plate PL1. The first polarizing plate PL1 has an absorption axis in a fourth direction d4. The first retardation film PD1 has a slow axis in a fifth direction d5.

The second optical element OD2 is formed by a second polarizing plate PL2 which counters the external surface of the second insulating substrate 20 and a second retardation film PD2 which are located between the second insulating substrate 20 and the second polarizing plate PL2. The second polarizing plate PL2 has the absorption axis in the fifth direction d5. The second retardation film PD2 has the slow axis in the fourth direction d4.

Here, the fourth direction d4 is a direction which inclines by 45 degrees from the first direction X and the second direction Y in the X-Y plane. The fifth direction d5 is a direction which intersects perpendicularly the fourth direction d4 in the X-Y plane. Since the absorption axis of the first polarizing plate PL1 and the absorption axis of the second polarizing plate PL2 are arranged in a spatial relationship in which the absorption axis of the first polarizing plate PL1 and the second polarizing plate PL2 intersect perpendicularly, the first polarizing plate PL1 and the second polarizing plate PL2 are arranged in the Cross Nicol state.

The first retardation film PD1 and the first polarizing plate PL1 are arranged so that the slow axis and the absorption axis intersect perpendicularly. The second retardation film PD2 and the second polarizing plate PL2 are arranged so that the slow axis and the absorption axis intersect perpendicularly. Thereby, the first retardation film PD1 and the second retardation film PD2 can compensate the viewing angle dependency property of the first polarizing plate PL1 and the second polarizing plate PL2.

Moreover, not only the above-mentioned example, but the first polarizing plate PL1 may have the absorption axis in the fifth direction d5, the first retardation film PD 1 may have the slow axis in the fourth direction d4, the second polarizing plate PL2 has the absorption axis in the fourth direction d4, and the second retardation film PD2 may have the slow axis in the fifth direction d5. In addition, it is necessary that the directions of the absorption axis of the polarizing plate and the slow axis of the retardation film are matched with behavior of the liquid crystal molecules.

Figure 5:
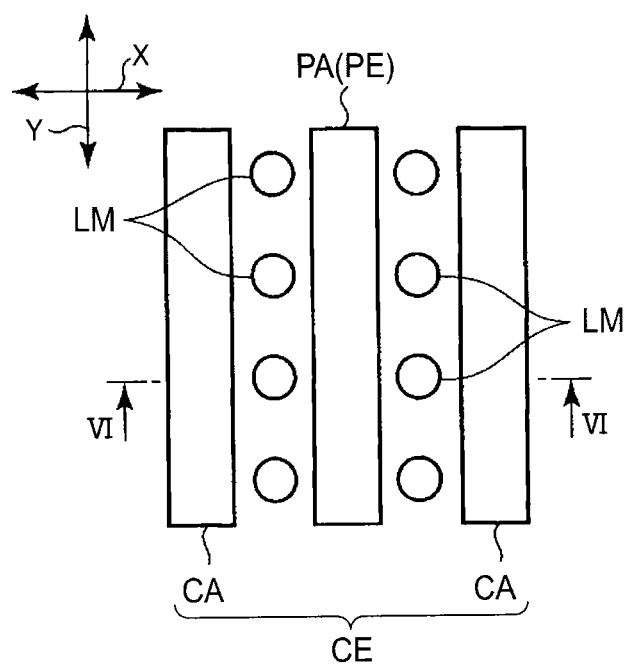
FIG. 5 is a plan view showing a pixel electrode and a common electrode of the liquid crystal display panel, and is a schematic view showing an alignment state of a liquid crystal molecule in case voltage is not impressed to a liquid crystal layer.
Figure 6:
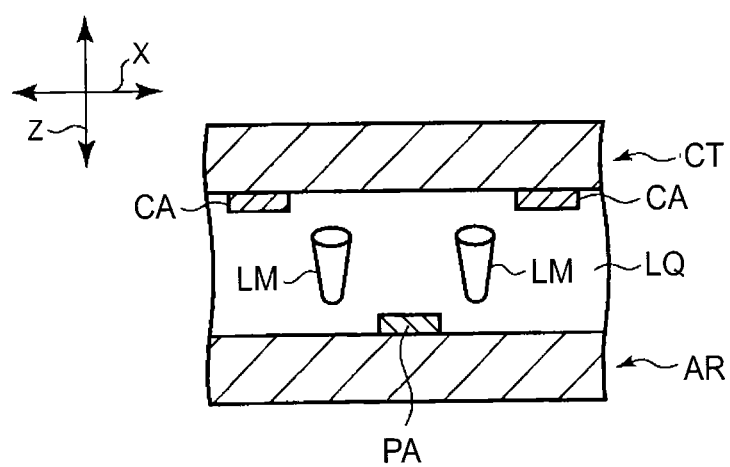
FIG. 6 is a cross-sectional view schematically showing the structure taken along line VI-VI in the liquid crystal display panel shown in FIG. 5.

Next, the operation of the liquid crystal display panel LPN of the above-mentioned structure is explained. FIG. 5 is a plan view showing the pixel electrode PE and the common electrode CE of the liquid crystal display panel LPN, and is a schematic view showing the alignment state of the liquid crystal molecule LM in case voltage is not impressed to the liquid crystal layer LQ. FIG. 6 is a cross-sectional view schematically showing a structure taken along line VI-VI in the liquid crystal display panel LPN shown in FIG. 5.

As shown in FIG. 3, FIG. 5, and FIG. 6, in a state where voltage is not impressed to the liquid crystal layer LQ, i.e., the state where electric field is not formed between the pixel electrode PE and the common electrode CE (at the time of OFF), the first alignment film AL1 and the second alignment film AL2 align the liquid crystal molecule LM of the liquid crystal layer LQ in the third direction Z (vertical alignment). The time of OFF corresponds to the initial alignment state, and the alignment direction of the liquid crystal molecule LM at the time of OFF corresponds to the initial alignment direction.

Since the liquid crystal layer LQ has positive refractive-index anisotropy, it can be presumed that the liquid crystal layer LQ is a positive uniaxial optical film in the state where the liquid crystal molecule LM aligns in the third direction Z. The first retardation film PD1 and the second retardation film PD2 are formed so that they function as a negative uniaxial optical film as a total. Thereby, phase difference among the liquid crystal layer LQ, the first retardation film PD1 and the second retardation film PD2 is set to 0 as a total. Since the refractive-index anisotropy of the liquid crystal layer LQ and the retardation films (PD1, PD2) is compensated mutually, a good black display can be obtained.

Figure 7:
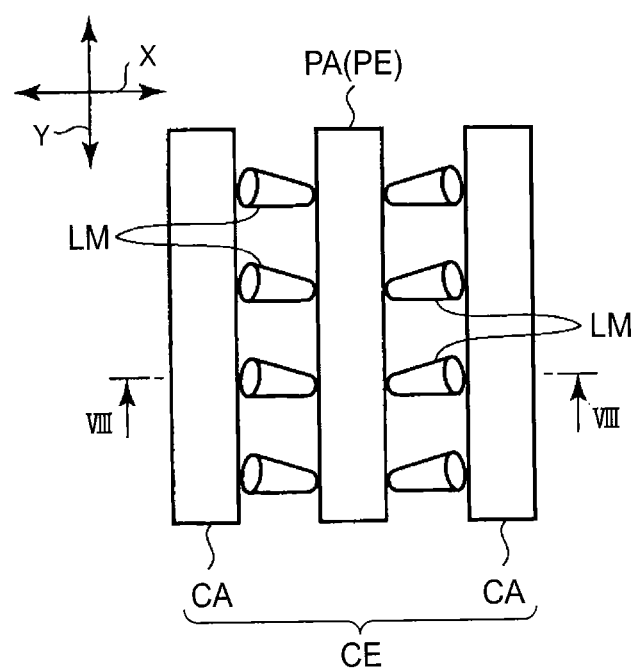
FIG. 7 is a plan view showing the pixel electrode and the common electrode of the liquid crystal display panel, and is a schematic view showing the alignment state of the liquid crystal molecule in case voltage is impressed to the liquid crystal layer.
Figure 8:
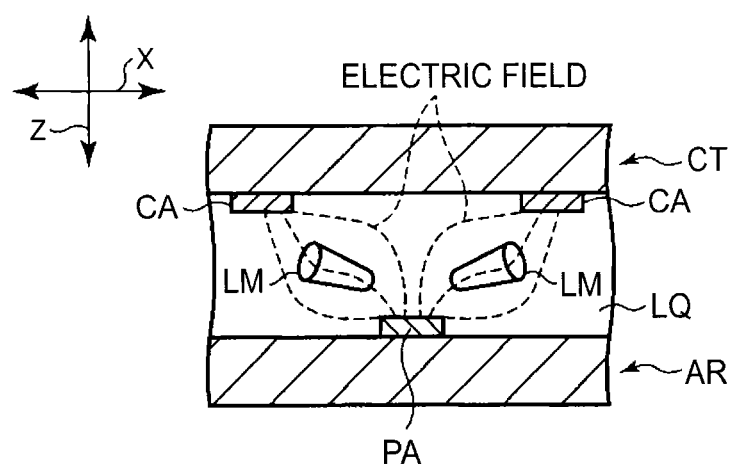
FIG. 8 is a cross-sectional view schematically showing the structure taken along line VIII-VIII in the liquid crystal display panel shown in FIG. 7.

FIG. 7 is a plan view showing the pixel electrode PE and the common electrode CE of the liquid crystal display panel LPN, and is a schematic view showing the alignment state of the liquid crystal molecule LM in case voltage is impressed to the liquid crystal layer LQ. FIG. 8 is a cross-sectional view schematically showing a structure taken along line VIII-VIII in the liquid crystal display panel LPN shown in FIG. 7.

As shown in FIG. 7 and FIG. 8, substantially parallel lateral electric field (or oblique electric field) is formed between the pixel electrode PE and the common electrodes CE in the state where voltage is impressed to the liquid crystal layer LQ, i.e., in the state where electric field is formed between the pixel electrode PE and the common electrode CE (at the time of ON). The liquid crystal molecule LM is affected by the electric field, and inclines in the first direction X from the third direction Z (switching).

Thus, in each pixel PX, where electric field is formed between the pixel electrode PE and the common electrode CE, the alignment direction of the liquid crystal molecule LM is divided into two or more directions by being bordered with the pixel electrode PE, and forms domains in each alignment direction. That is, two or more domains are formed in one PX.

Although, in the liquid crystal layer LQ and the retardation films (PD1, PD2) as a whole, phase difference decreases a little at the X-Y plane, it is almost constant. Moreover, the first polarizing plate PL1 and the second polarizing plate PL2 are arranged so that, the fourth direction d4 (the direction of the absorption axis of the first polarizing plate PL1) and the fifth direction d5 (the direction of the absorption axis of the second polarizing plate PL2) may be set to 45 degrees with respect to the X direction (direction to which the liquid crystal molecule LM inclines). Since the backlight emitted from the backlight unit 4 at the time of ON penetrates the liquid crystal display panel LPN, a good image display (white display) can be obtained.

In the liquid crystal display device according to the first embodiment constituted as mentioned above, the liquid crystal display panel LPN is equipped with the array substrate AR, the counter substrate CT, and the liquid crystal layer LQ. The array substrate AR has the pixel electrode PE containing the main pixel electrode PA and the first alignment film AL1 that shows vertical alignment characteristics. The counter substrate CT has two main common electrodes CA and the second alignment film AL2 that shows vertical alignment characteristics. The liquid crystal layer LQ has positive dielectric anisotropy.

As mentioned above, the distance between the main pixel electrode PA and the main common electrode CA in the direction X is larger than the thickness of the liquid crystal layer. Specifically, the distance between the main pixel electrode PA and the main common electrode CA is larger more than twice the thickness of the liquid crystal layer. For this reason, it becomes possible to act substantially lateral electric field in parallel to the substrate on the liquid crystal layer LQ. Thereby, even if it is in a case where the liquid crystal molecule LM formed of the p type liquid crystal material is initially aligned vertically, the long axis of the liquid crystal molecule LM is aligned in the lateral electric field. Both the polar angle and the directional angle of the liquid crystal molecule LM can be specified. Accordingly, the liquid crystal display device with large regulation strength for alignment (intensity for alignment) of the liquid crystal molecule can be obtained.

Moreover, since the p type liquid crystal material cheaper than the n type liquid crystal material can be used, reduction of manufacturing cost can be made. Since the first alignment film AL1 and the second alignment film AL2 can be formed without performing rubbing (alignment treatment), it becomes possible to suppress electrostatics breakdown by the rubbing.

Here, the inventors investigated generating of polling by applying external pressure. When it was investigated whether the finger pressing trace would leave or not, the trace was not generated at all in the liquid crystal display device formed as mentioned above. Namely, the pooling was not generated. The inventors also investigated the generation of the pooling in the display modes such as the VA (Vertical Alignment) mode and the MVA (Multi-domain Vertical Alignment) mode as comparative examples. The result was that, in the liquid crystal display in MVA mode, the pressing trace by finger is left, i.e., the polling was generated.

Furthermore, the inventors also investigated the response time of the liquid crystal. When the response time of the liquid crystal of the liquid crystal display device in the MVA mode was standardized to 1.0, the response time of the liquid crystal of the liquid crystal display according to this embodiment was 0.8, and became earlier than the liquid crystal display device in the MVA mode. This difference of the response time is generated because the angle of the directional is not specified in the liquid crystal display device in the MVA mode, in which n type liquid crystal material is used.

Moreover, since high transmissivity is obtained in the electrode gap between the pixel electrode PE and the common electrode CE according to this embodiment, it becomes possible to correspond by expanding the inter-electrode distance between the pixel electrode PE and the main common electrodes CAL and CAR in order to make transmissivity of each pixel high enough. Moreover, in the product specifications in which a pixel pitch differs each other, the same effect as the embodiment mentioned above can be acquired by changing the inter-electrode distance, i.e., by changing the arrangement location of the main common electrodes CA with respect to the pixel electrode PE arranged in the center of the pixel. That is, in the display mode according to this embodiment, it becomes possible to offer the product having various pixel pitches by setting up inter-electrode distance without necessarily using microscopic processing corresponding to the product specification from low resolution with a comparatively large pixel pitch to high resolution with a comparatively small pixel pitch. Therefore, it becomes possible to realize the demand for high transmissivity and high resolution easily.

Moreover, if its attention is paid to the transmissivity distribution in the region which overlaps with the black matrix BM, the transmissivity fully falls. This is because the leak of electric field does not occur outside of the pixel from the common electrode CE, and undesired lateral electric field is not produced between the adjoining pixels on the both sides of the black matrix BM. That is, it is because the liquid crystal molecule of the region which overlaps with the black matrix BM maintains the state of initial alignment like at the OFF time (or the time of a black display). Therefore, even if it is a case where the colors of the color filter differ between the adjoining pixels, it becomes possible to control the generating of mixed colors, and also becomes possible to control the fall of color reproducibility and the contrast ratio.

Moreover, when an assembling shift occurs between the array substrate AR and the counter substrate CT, a difference may arises in distances between the respective common electrodes CE of the both sides and the pixel electrode PE. However, the alignment shift is produced in common to all the pixels PX, there is no difference in the electric field distribution between the pixels PX, and the influence to the display of the image is negligible. Even if the assembling shift arises between the array substrate AR and the counter substrate CT, it becomes possible to control the undesirable electric field leak to the adjoining pixels. For this reason, even if it is in a case where the color of the color filter differs between the adjoining pixels, it becomes possible to control generating of mixed colors, and also becomes possible to realize more genuine color reproducibility nature.

In this embodiment, the main common electrode CA counters with the source line S. When the main common electrode CAL and the main common electrode CAR are especially arranged above the source line S1 and the source line S2, respectively, the aperture portion AP which contributes to the display can be expanded as compared with the case where the second main common electrode CAL and the second main common electrode CAR are arranged on the main pixel electrode PA side rather than above the source line S1 and the source line S2, and it becomes possible to improve the transmissivity of the pixel PX.

Moreover, it becomes possible to expand the distances between the main pixel electrode PE and the second main common electrode CAL, and between the main pixel electrode PE and the second main common electrode CAR by arranging each of the second main common electrodes CAL and the second main common electrode CAR above the source line S1 and the source line S2, respectively, and also becomes possible to form more horizontal electric field closer to the horizontal direction. For this reason, it becomes possible to also maintain the wide viewing angle which is advantages of the general IPS mode. Moreover, the above-mentioned liquid crystal display device is excellent in high-speed response, and also in alignment stability.

Moreover, according to this embodiment, it becomes possible to form two or more domains in each pixel. For this reason, a viewing angle can be optically compensated in two or more directions, and wide viewing angle is attained.

Furthermore, at the time of ON, since horizontal electric field is hardly formed (or sufficient electric field to drive the liquid crystal molecule LM is not formed), the liquid crystal molecule LM hardly moves from the initial alignment direction like at the time of OFF. For this reason, as mentioned-above, even if the pixel electrode PE and the common electrode CE are formed of the electric conductive material with the light transmissive characteristics in these domains, back light hardly penetrates, and hardly contributes to the display at the time of ON. Therefore, the pixel electrode PE and the common electrode CE do not necessarily need to be formed of a transparent electric conductive material, and may be formed using electric conductive materials, such as aluminum and silver.

Figure 9:
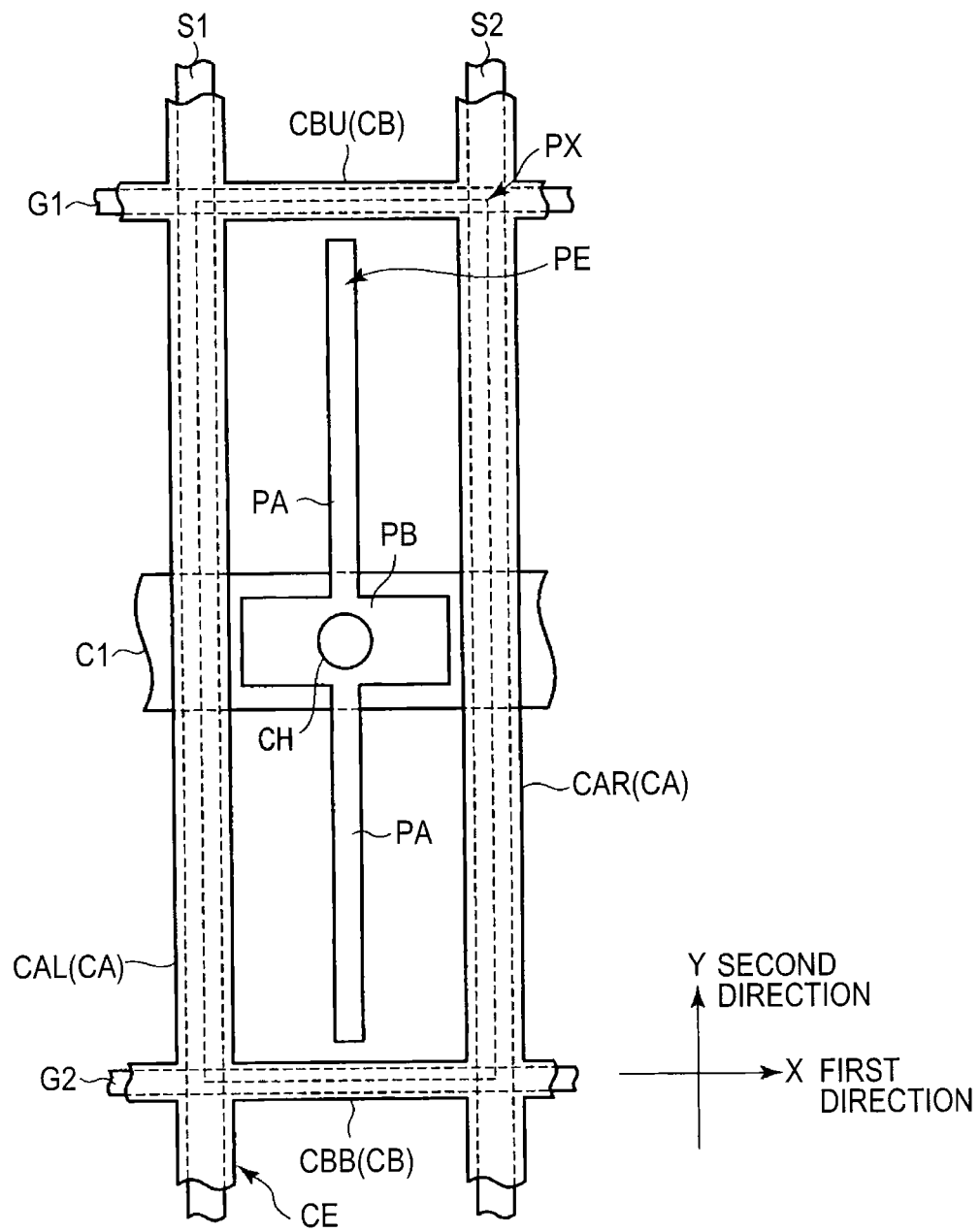
FIG. 9 is a plan view schematically showing the structure of one pixel when the liquid crystal display panel of the liquid crystal display device according to a second embodiment is seen from the counter substrate side.

Next, the liquid crystal display device according to a second embodiment is explained in detail. In this embodiment, the same mark is given to the same functional portion as the first embodiment, and detailed explanation is omitted. FIG. 9 is a plan view schematically showing the structure of one pixel PX when the liquid crystal display panel LPN of the liquid crystal display device according to a second embodiment is seen from the counter substrate side.

As shown in FIG. 9, the structure of the pixel PX is different as compared with the structure shown in FIG. 2 in the point that the pixel electrode PE is formed in the shape of a cross, and that the common electrode CE is formed in the shape of a lattice so as to surround the pixel PX.

The pixel electrode PE is equipped with a main pixel electrode PA and a sub-pixel electrode PB which are electrically connected mutually. The main pixel electrode PA and the sub-pixel electrode PB are covered by the first alignment film AL1. The main pixel electrode PA linearly extends along the second direction Y from the sub-pixel electrode PB to a vicinity of an upper end and a vicinity of a bottom end of the pixel PX. The sub-pixel electrode PB extends along the first direction X. The sub-pixel electrode PB is located in a region which overlaps with the auxiliary capacitance line C1, and is electrically connected with the switching element through a contact hole CH. In the illustrated example, the sub-pixel electrode PB is formed substantially in the center of the pixel PX, and the pixel electrode PE is formed in the cross shape.

The common electrode CE includes sub-common electrodes CB which extend along the first direction X besides the above-mentioned main common electrode CA. The sub-common electrodes CB are arranged with a predetermined distance in the second direction Y, and sandwiches the main pixel electrodes PA in the second direction Y. The sub-common electrodes CB are electrically connected with the main common electrodes CA. The sub-common electrodes CB are covered by the second alignment film AL2 with the main common electrode CA.

The main common electrodes CA and the sub-common electrode CB are formed integrally or continuously. The sub-common electrode CB counters with each of the gate lines G. In the illustrated example, the sub-common electrode CB is constituted by two lines extending along the first direction X. In order to distinguish the two lines, the sub-common electrode of the upper portion in the figure is called CBU, and the sub-common electrode of the bottom portion in the figure is called CBB hereinafter. The sub-common electrode CBU is arranged at the upper end of the pixel PX, and counters with the gate line G1. That is, the sub-common electrode CBU is arranged striding over a boundary between the illustrated pixel and a pixel adjoining the illustrated pixel PX on its upper side. Moreover, the sub-common electrode CBB is arranged at the bottom end of the pixel PX, and counters with the gate line G2. That is, the sub-common electrode CBB is arranged striding over a boundary between the illustrated pixel and a pixel adjoining the illustrated pixel PX on the bottom side.

If its attention is paid to the positional relationship between the pixel electrode PE and the common electrode CE, the main pixel electrode PA and the main common electrode CA are arranged by turns along the first direction X, and the sub-pixel electrode PB and the sub-common electrode CB are arranged by turns along the second direction Y. That is, between the adjoining main common electrode CAL and the main common electrode CAR, one main pixel electrode PA is located. The main common electrode CAL, the main pixel electrode PA, and the main common electrode CAR are arranged in a line along the first direction X in this order. Moreover, between the adjoining sub-common electrode CBB and the sub-common electrode CBU, one sub-pixel electrode PB is located, and the sub-common electrode CBB, the sub-pixel electrode PB, and the sub-common electrode CBU are arranged in a line along the second direction Y in this order.

In addition, in the second embodiment, the first polarizing plate PL1 has an absorption axis in the first direction X, and the first retardation film PD1 has a slow axis in the second direction Y. The second polarizing plate PL2 has the absorption axis in the second direction Y, and the second retardation film PD2 has the slow axis in the first direction X.

Not limited to above example, the first polarizing plate PL1 may have the absorption axis in the second direction Y, and the first retardation film PD1 may have the slow axis in the first direction X. The second polarizing plate PL2 may have the absorption axis in the first direction X, and the second retardation film PD2 may have the slow axis in the second direction Y.

Figure 10:
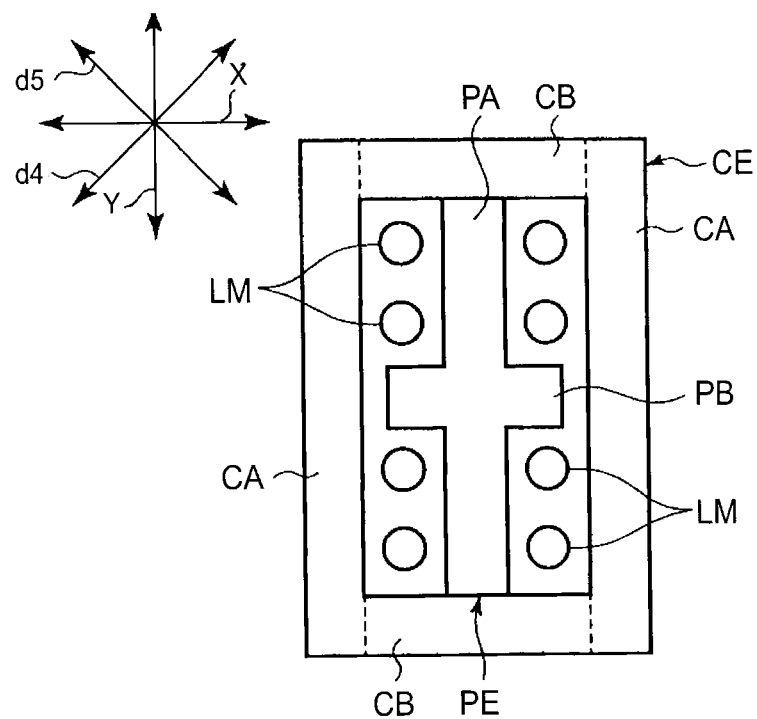
FIG. 10 is a plan view showing the pixel electrode and the common electrode of the liquid crystal display panel of the liquid crystal display device according to the second embodiment, and is a schematic view showing the alignment state of the liquid crystal molecule in case voltage is not impressed to the liquid crystal layer.

FIG. 10 is a plan view showing the pixel electrode PE and the common electrode CE of the above-mentioned liquid crystal display panel LPN, and is a schematic view showing the alignment state of the liquid crystal molecule LM in case voltage is not impressed to the liquid crystal layer LQ.

In the state where voltage is not impressed to the liquid crystal layer LQ as shown in FIG. 3 and FIG. 10, like the first embodiment, that is, electric field is not formed between the pixel electrode PE and the common electrode CE, the first alignment film AL1 and the second alignment film AL2 align the liquid crystal molecule LM of the liquid crystal layer LQ in the third direction Z (vertical alignment). The state (at the time of OFF) corresponds to the state of initial alignment, and the alignment direction of the liquid crystal molecule LM at the time of OFF corresponds to the direction of initial alignment.

Since the liquid crystal layer LQ has positive refractive-index anisotropy, after the liquid crystal molecule LM is aligned in the third direction Z, the liquid crystal layer LQ can be deemed as a positive uniaxis optical film. The first retardation film PD1 and the second retardation film PD2 are formed so that the films totally function as a negative uniaxis optical film. Thereby, phase difference is set to 0 by the liquid crystal layer LQ, the first retardation film PD1 and the second retardation film PD2 as a total. Since the liquid crystal layer LQ and the refractive-index anisotropy of the retardation films (PD1, PD2) are compensated mutually, a good black display is obtained.

Figure 11:
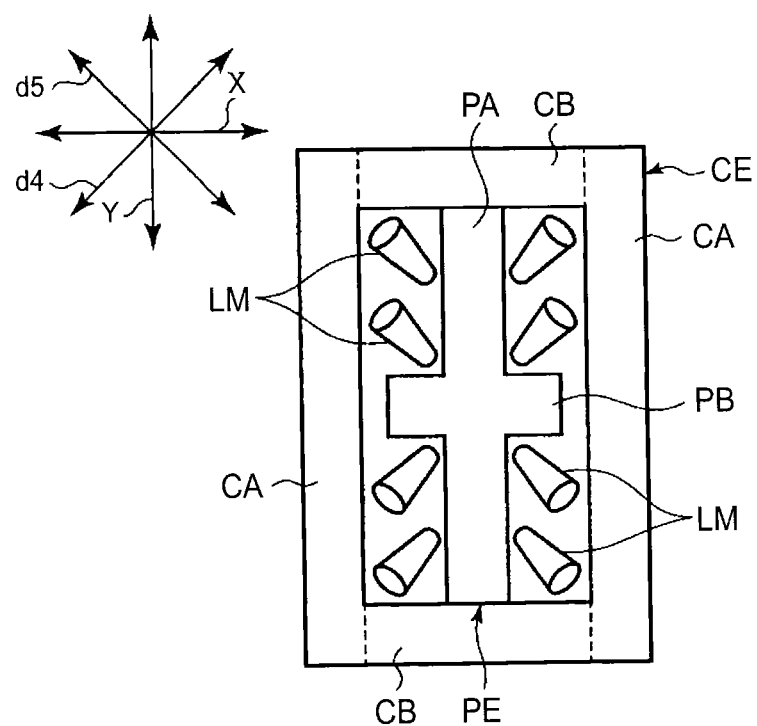
FIG. 11 is a plan view showing the pixel electrode and the common electrode of the liquid crystal display panel of the liquid crystal display according to the second embodiment, and is a schematic view showing the alignment state of the liquid crystal molecule in case voltage is impressed to the liquid crystal layer.

FIG. 11 is a plan view showing the pixel electrode PE and the common electrode CE of the above-mentioned liquid crystal display panel LPN, and is a schematic view showing the alignment state of the liquid crystal molecule LM in case voltage is impressed to the liquid crystal layer LQ.

In the state where the voltage is impressed to the liquid crystal layer LQ (at the time of ON), i.e., the state where electric field is formed between the pixel electrode PE and the common electrode CE as shown in FIG. 11, parallel lateral electric field (or oblique electric field) is formed between the pixel electrode PE and the common electrodes CE. The liquid crystal molecule LM is affected by the electric field, and inclines, i.e., is switched in general from the third direction Z to the fourth direction d4 or fifth direction d5.

Thus, in each pixel PX, when electric field is formed between the pixel electrode PE and the common electrode CE, the direction of the alignment of the liquid crystal molecule LM is divided in two or more directions by being divided by the pixel electrode PE, and a plurality of domains corresponding the respective directions are formed. That is, the plurality of domains is formed in one PX. Therefore, it becomes possible to form more domains than the first embodiment, and also becomes possible to expand the viewing angle.

In the whole of the liquid crystal layer LQ and retardation films (PD1, PD2), although phase difference decreases a little in the X-Y plane, it is almost constant. Moreover, the first polarizing plate PL1 and the second polarizing plate PL2 are arranged so that the fourth direction d4 and the fifth direction d5 (direction to which the liquid crystal molecule LM inclines), may be 45 degrees with respect to the first direction X (the direction of the absorption axis of the first polarizing plate PL1) and the second direction Y (the direction of the absorption axis of the second polarizing plate PL2), respectively. Since the backlight emitted from the backlight unit 4 at the time of ON penetrates the liquid crystal display panel LPN, a good image display (white display) is performed.

According to the liquid crystal display device according to the second embodiment constituted as mentioned above, the liquid crystal display panel LPN is equipped with the array substrate AR, the counter substrate CT, and the liquid crystal layer LQ. Since the lateral electric field can be made to act on the liquid crystal layer LQ by the pixel electrode PE and the common electrode CE, even if it is in a case where the liquid crystal molecule LM is initially aligned perpendicularly, the liquid crystal layer LQ can be formed by p type liquid crystal material, and the liquid crystal molecule LM can be aligned in the direction in which the long axis is aligned along the lateral electric field. The lateral electric field can define both the polar angle and the directional angle of the liquid crystal molecule LM. In addition, the same effect as the first embodiment is acquired. Accordingly, the liquid crystal display device with large regulation strength for alignment (intensity for alignment) of the liquid crystal molecule can be obtained as mentioned above.

In each pixel PX, when electric field is formed between the pixel electrode PE and the common electrode CE, it becomes possible to form more domains than the example shown in the first embodiment, and also becomes possible to expand the viewing angle. Furthermore, it becomes possible to make the regulation strength for alignment of the liquid crystal molecule larger than the first embodiment.

Since the pixel can be divided into four domains so that the arrangement direction of the liquid crystal molecules in each domain may forms a crossing-angle of substantially 90 degrees therebetween when voltage is impressed to the liquid crystal layer, the improvement of symmetrical property of the visual-angle characteristic and suppression of inversion phenomenon are realizable.

Figure 12:
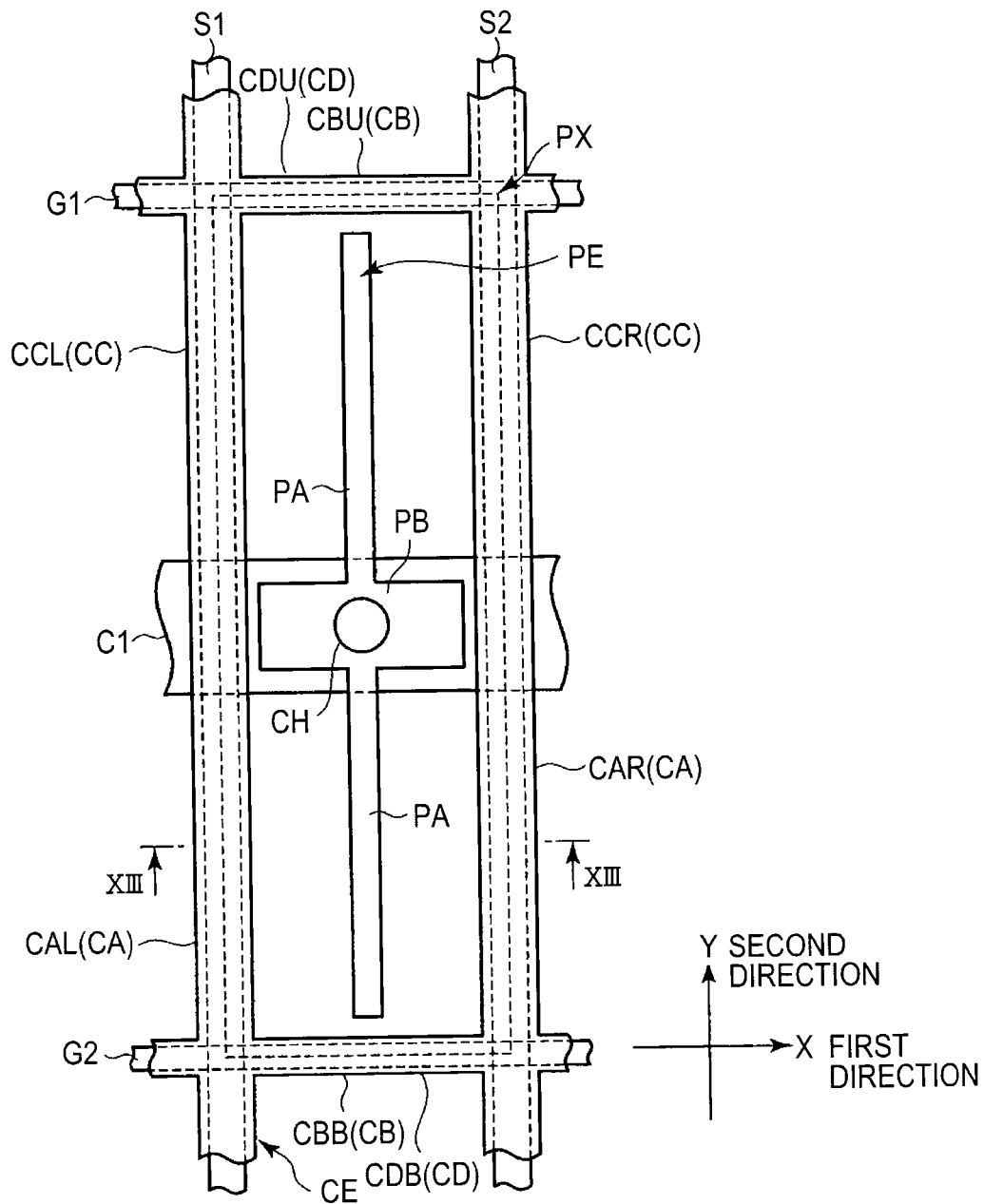
FIG. 12 is a plan view schematically showing the structure of the liquid crystal display panel of the liquid crystal display device according to a third embodiment when the liquid crystal display panel is seen from the counter substrate side.

Next, the liquid crystal display device according to a third embodiment is explained in detail. In this embodiment, the same mark is given to the same functional portion as the second embodiment, and that detailed explanation is omitted. FIG. 12 is a plan view schematically showing the structure of the pixel PX when the liquid crystal display panel LPN of the liquid crystal display according to the third embodiment is seen from the counter substrate side.

As shown in FIG. 12, the structure of the pixel PX is different from that shown in FIG. 9 in that a portion of the common electrodes CE is formed in the array substrate AR side. The common electrode CE is further equipped with a pair of main common electrodes CC and a pair of sub-common electrodes CD which are formed in the array substrate AR side.

In the X-Y plane, the main common electrodes CC are arranged with a predetermined distance therebetween in the first direction X, and facing the main common electrode CA. The main common electrodes CC are formed so that main common electrodes CC sandwiched the main pixel electrode PA in the first direction X, and extend linearly along the second direction Y. The main common electrodes CC counter, respectively, with the source lines S and extend substantially in parallel with the main pixel electrode PA. The main common electrodes CC are formed in the shape of a belt, and have substantially the same width along the first direction X.

In the illustrated example, the main common electrodes CC are arranged in two lines in parallel along the first direction X, and are arranged at the right-and-left both ends of the pixel PX, respectively. Hereinafter, in order to distinguish the main common electrodes CC, the main common electrode of the left-hand side in the figure is called CCL, and the main common electrode of the right-hand side in the figure is called CCR. Main common electrode CCL faces the source line S1, and the main common electrode CCR faces the source line S2.

In the pixel PX, the main common electrode CCL is arranged at the left-hand side end, and the main common electrode CCR is arranged at the right-hand side end. Precisely, the main common electrode CCL is arranged striding over a boundary between the illustrated pixel PX and the adjoining pixel PX on its left-hand side, and the main common electrode CCR is arranged a boundary between the illustrated pixel PX and the adjoining pixel PX on its right-hand side.

If its attention is paid to the positional relationship between the pixel electrode PE and the main common electrode CC, the pixel electrode PE and main common electrode CC are arranged by turns along the first direction X. The pixel electrodes PE and the main common electrode CC are arranged mutually and substantially in parallel. At this time, none of the main common electrodes CC overlaps with the pixel electrode PE in the X-Y plane.

One pixel electrode PE is located between adjoining main common electrode CCL and main common electrode CCR. That is, the pixel electrode PE is arranged between the main common electrode CCL and the main common electrode CCR. For this reason, the main common electrode CCL, the main pixel electrode PA, and the main common electrode CCR are arranged along the first direction X in this order.

The sub-common electrodes CD extend along the first direction X. The sub-common electrodes CD are arranged with a predetermined distance therebetween in the second direction Y, sandwich the main pixel electrode PA in the second direction Y, and are electrically connected with the main common electrodes CC. The main common electrode CC and the sub-common electrode CD are formed in the same layer using the same material as the pixel electrode PE, and are covered by the first alignment film AL1 with the pixel electrode PE. The main common electrode CC and the sub-common electrode CD are set to the same potential as the main common electrode CA (sub-common electrode CB).

The main common electrodes CC and the sub-common electrodes CD are formed integrally or continuously. The respective sub-common electrodes CD counter with each of the gate lines G. In the illustrated example, the sub-common electrodes CD are constituted by two lines extending along the first direction X. In order to distinguish the two lines, the sub-common electrode arranged in the upper portion in the figure is called CDU, and the sub-common electrode arranged in the bottom portion in the figure is called CDB hereinafter. The sub-common electrode CDU is arranged at the upper end of the pixel PX, and counters with the gate line G1. That is, the sub-common electrode CDU is arranged striding over a boundary between the illustrated pixel and a pixel adjoining the illustrated pixel PX on its upper side. Moreover, the sub-common electrode CDB is arranged at the bottom end of the pixel PX, and counters with the gate line G2. That is, the sub-common electrode CDB is arranged striding over a boundary between the illustrated pixel and a pixel adjoining the illustrated pixel PX on the bottom side.

If its attention is paid to the positional relationship between the pixel electrode PE and the common electrode CE, the sub-pixel electrode PB and sub-common electrode CD are arranged by turns along the second direction Y. That is, between the adjoining sub-common electrode CDB and sub-common electrode CDU, the sub-pixel electrode PB is located. Furthermore, the sub-common electrode CDB, the sub-pixel electrode PB, and the sub-common electrode CDU are arranged in a line along the second direction Y.

Figure 13:
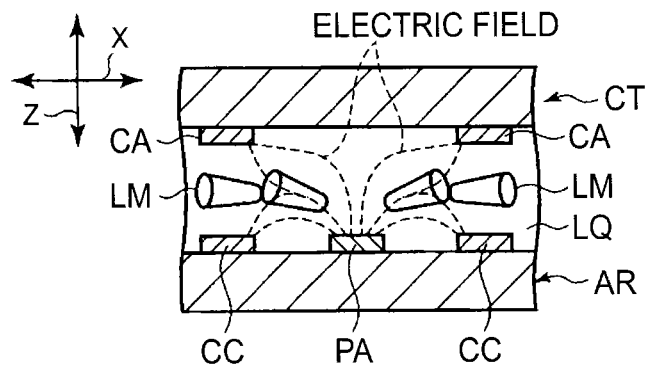
FIG. 13 is a cross-sectional view schematically showing the structure taken along line XIII-XIII of the liquid crystal display panel shown in FIG. 12, and is a schematic view showing an alignment state of the liquid crystal molecule in case voltage is impressed to the liquid crystal layer.

FIG. 13 is a cross-sectional view schematically showing the structure taking along line XIII-XIII in the liquid crystal display panel LPN shown in FIG. 12, and is a schematic view showing the alignment state of the liquid crystal molecule LM in case voltage is impressed to the liquid crystal layer LQ.

As shown in FIG. 12 and FIG. 13, in the state where voltage is impressed to the liquid crystal layer LQ between the pixel electrode PE and the common electrodes CE (at the time of ON), i.e., the state where electric field is formed between the pixel electrode PE and the common electrode CE, lateral electric field (or oblique electric field) is formed between the pixel electrode PE and the common electrodes CE. The liquid crystal molecule LM is affected by the electric field, and inclines from the third direction Z to the fourth direction d4 or the fifth direction d5 (switching).

In each pixel PX, when electric field is formed between the pixel electrode PE and the common electrode CE, a plurality of domains are formed in the PX. Since the backlight emitted from the backlight unit 4 at the time of ON penetrates the liquid crystal display panel LPN, a good image display (white display) is performed.

The electric field is also formed not only between the pixel electrode PE and the main common electrodes CA, and between the pixel electrode PE the sub-common electrodes CB, but between the pixel electrode PE and main common electrode CC, and between the pixel electrode PE and sub-common electrode CD. Further, since the liquid crystal molecule LM inclines (switching) between the main common electrode CA and the main common electrode CC, and between the sub-common electrode CB and sub-common electrode CD, the liquid crystal molecule LM can contribute to improvement in the transmissivity.

Moreover, when one pixel PX is seen in the X-Y plane, the pixel electrode PE formed on the array substrate AR is arranged inside the common electrode CE formed on the counter substrate. In other words, in one pixel PX, the pixel electrode PE is surrounded with the common electrode CE. By arranging in this way, the pixel has a starting point and a terminal point of electric flux line, and the electric flux line of one pixel does not leak to adjoining pixels. For this reason, for example, it can be controlled that electric field impressed to the liquid crystal layer LQ is mutually affected between the adjoining pixels PX in the second direction Y, and the liquid crystal molecule of the pixel can not be driven under the influence of the electric field from adjoining pixels PX. Accordingly, the degradation of the display can be controlled.

Here, the inventors investigated the transmissivity of the liquid crystal display panel LPN of the liquid crystal display device according to this embodiment. Moreover, the inventors also investigated the transmissivity of the liquid crystal display panel LPN according to the second embodiment in which the main common electrode CC and sub-common electrode CD are not formed as a comparative example.

Figure 14:
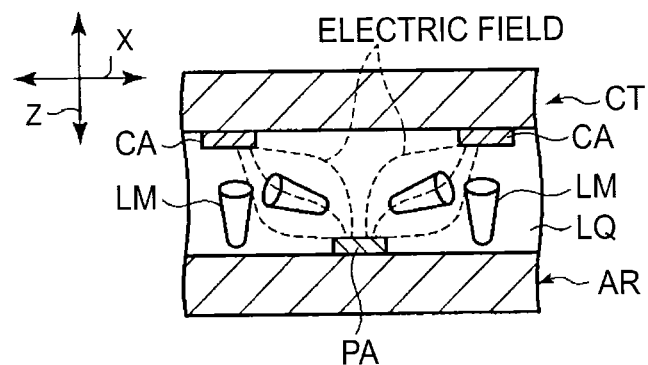
FIG. 14 is a cross-sectional view schematically showing the structure of a comparative example of the liquid crystal display device according to the third embodiment, and is a schematic view showing the alignment state of the liquid crystal molecule in case voltage is impressed to the liquid crystal layer.

FIG. 14 is a cross-sectional view schematically showing the structure of the liquid crystal display panel LPN of the comparative example with this embodiment, and is a schematic view showing the alignment state of the liquid crystal molecule LM in case voltage is impressed to the liquid crystal layer LQ.

As shown in FIG. 14, the liquid crystal display panel LPN of the comparative example is formed like the liquid crystal display panel LPN according to this embodiment except being formed without the main common electrode CC and the sub-common electrode CD.

The transmissivity was investigated, and the investigated transmissivity of the liquid crystal display panel LPN according to the comparative example shown in FIG. 14 was standardized to 1.0. Then, the transmissivity of the liquid crystal display panel LPN according to this embodiment shown in FIG. 13 was 1.05, and resulted in higher value than the comparative example shown in FIG. 14. This is because the liquid crystal molecule LM is fully inclined also in a periphery of the aperture portion of the pixel PX in the liquid crystal display panel LPN according to this embodiment shown in FIG. 13 (switching).

According to the liquid crystal display device according to the third embodiment constituted as mentioned above, the liquid crystal display panel LPN is equipped with the array substrate AR, the counter substrate CT, and the liquid crystal layer LQ. Since lateral electric field can be made to act on the liquid crystal layer LQ, with the pixel electrode PE and the common electrode CE, even if it is in a case where the liquid crystal molecule LM is initially aligned vertically, the liquid crystal layer LQ can be formed by the p type liquid crystal. Accordingly, it becomes possible to align the liquid crystal molecule LM so that its long axis is aligned along the lateral electric field direction. Both the polar angle and the angle of direction of the liquid crystal molecule LM can be specified by the lateral electric field. In addition, the same effect as the second embodiment is acquired. The liquid crystal display device with large regulation strength for alignment (intensity for alignment) of the liquid crystal molecule can be obtained from the above-mentioned structure.

The common electrode CE is further equipped with the main common electrode CC and the sub-common electrode CD which are formed in the array substrate AR side. Since the liquid crystal display panel LPN according to this embodiment can make electric field act on the liquid crystal layer LQ so that the liquid crystal molecule LM may be fully inclined also in the periphery of the aperture portion of the pixel PX (switching), the higher transmissivity can be obtained than that of the liquid crystal display panel LPN according to the second embodiment.

Moreover, undesirable electric field from the source line S can be shielded by providing the main common electrode CC. Further, undesirable electric field from the gate line G and the auxiliary capacitance line C can be shielded by providing the sub-common electrode CD. According to the structure equipped with the main common electrode CC and the sub-common electrode CD, it is possible to control the degradation of the display grace.

In addition, the common electrode CE may be equipped with at least one of the main common electrode CC and the sub-common electrode CD. Also in this case, the main common electrode CC and the sub-common electrode CD can show the same effect as mentioned-above, respectively.

Figure 15:
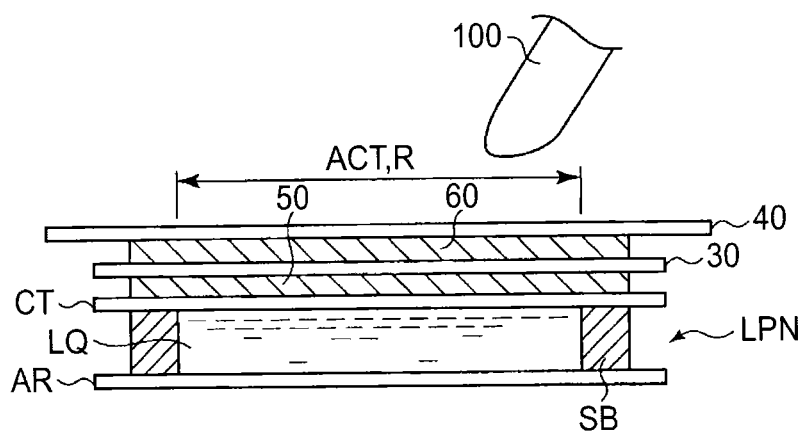
FIG. 15 is a cross-sectional view schematically showing the liquid crystal display device according to a fourth embodiment.

Next, the liquid crystal display device according to a fourth embodiment is explained in detail. In this embodiment, the same mark is given to the same functional portion as the embodiment mentioned above, and that detailed explanation is omitted. FIG. 15 is a cross-sectional view schematically showing the liquid crystal display device according to the fourth embodiment.

As shown in FIG. 15, the liquid crystal display device is equipped with a liquid crystal display panel LPN, a sensing substrate 30, a protection plate 40, and adhesives 50 and 60. Any one of the liquid crystal display panels LPN according to the first to third embodiments mentioned above is used as the liquid crystal display panel LPN. Here, the liquid crystal display panel LPN according to the first embodiment is used.

The sensing substrate 30 counters with the display surface of the liquid crystal display panel LPN. The sensing substrate 30 has an input area R which overlaps with the active area ACT. The sensing substrate 30 is equipped with a function as a touch panel, and detects position information inputted into the input area R by touching.

The adhesives 50 are overlapped with the active area ACT and the input area R at least. They are arranged between the liquid crystal display panel LPN and the sensing substrate 30, and attach the liquid crystal display panel LPN with the sensing substrate 30. A screen fit system is adopted for attaching the liquid crystal display panel LPN and the sensing substrate 30. In the screen fit system, transparent adhesives are filled up between the sensing substrate 30 and the liquid crystal panel LPN.

The adhesives 50 are formed with material which penetrates visible light at least. Moreover, the adhesives 50 can be formed by resin of light curing type using ultraviolet ray or visible light, or resin of heat curing type. Furthermore, the adhesives 50 may have a refractive index between the refractive index of the second insulating substrate 20 (counter substrate CT) and the refractive index of the sensing substrate 30. Thereby, the reflection of the light in the surface (interface) of the adhesives 50 can be reduced.

A protection plate 40 counters with the sensing substrate 30. The protection plate 40 decorates an input screen (display surface of the liquid crystal display panel LPN) side of the sensing substrate 30, that is, the appearance of the liquid crystal display device is decorated with the protection plate 40. The protection plate 40 is formed in the rectangle shape using transparent insulating materials such as glass and acrylic resin. The protection plate 40 has a frame region formed apart from the active area ACT and the input area R. A peripheral shield layer is formed in the frame region of the protection plate 40. The peripheral shield layer can be formed using black resin, etc.

The adhesives 60 are overlapped with the active area ACT and the input area R. They are located between the sensing substrate 30 and the protection plate 40, and attach the sensing substrate 30 and the protection plate 40. The adhesives 60 are formed with the materials in which visible light penetrates at least. As mentioned above, the screen fit system is adopted to attach the sensing substrate 30 and the protection plate 40, in which transparent adhesives are filled up between the sensing substrate 30 and the protection plate 40.

Moreover, the adhesives 60 can be formed by resin of light curing type using ultraviolet ray or visible light, or resin of heat curing type. Furthermore, the adhesives 60 may have a refractive index between the refractive index of the sensing substrate 30 and the refractive index of the protection substrate 40. Thereby, the reflection of the light in the surface (interface) of the adhesives 60 can be reduced.

As a position detection method of the sensing substrate 30, an electrostatic capacitance system, a resistive pressure sensing system, a light detection system, an electromagnetic induction system, etc., can be used. As input means 100, an operator's finger, a conductive tool, etc., can be used. That is, means suitable for the position detection method is chosen. In any systems, the external pressure is applied to the external surface of the protection plate 40 by the input means 100. The external surface of the protection plate 40 is tapped, pushed, and slid by the input means 100. As mentioned above, the sensing substrate 30 can detect the position information on the inputted position by applying the external pressure.

Since the screen fit system is used for the liquid crystal display device as mentioned above, the external pressure applied to the external surface of the protection plate 40 is more directly transmitted to the liquid crystal display panel LPN comparing with a case where an air gap system is adopted. Then, the layer thickness of the liquid crystal layer LQ changes as mentioned later. However, in the liquid crystal display panel LPN according to the embodiment, the regulation strength for alignment of the liquid crystal molecule is large. For this reason, it is hard to generate polling etc., and deterioration of display grace can be reduced, and also the liquid crystal display panel LPN which can correctly display an inputted character, picture, etc., is obtained.

According to the liquid crystal display device according to the fourth embodiment constituted as mentioned above, the liquid crystal display panel LPN is equipped with the array substrate AR, the counter substrate CT, and the liquid crystal layer LQ. Since the oblique electric field can be made to act on the liquid crystal layer LQ by the pixel electrode PE and the common electrode CE, even if it is a case where the liquid crystal molecule LM initially aligns vertically, the liquid crystal layer LQ can be formed by the p type liquid crystal material, and the liquid crystal molecule LM can be aligned in the direction in which the long axis is aligned along the oblique electric field. The lateral electric field can specify both the polar angle and the angle of direction of the liquid crystal molecule LM. In addition, the same effect as the first embodiment is acquired. Accordingly, the liquid crystal display device with large regulation strength for alignment (intensity for alignment) of the liquid crystal molecule can be obtained as mentioned above.

The liquid crystal display panel LPN, the sensing substrate 30, and the protection plate 40 are attached by the screen fit system, respectively. Since reflection of the light in the external surface (interface) of the liquid crystal display panel LPN, the sensing substrate 30, and the protection plate 40 can be reduced, it becomes possible to reduce the aggravation of the appearance of the displayed picture. Even if the external pressure is transmitted to the liquid crystal display panel LPN, generating of the polling can be prevented because the liquid crystal display panel LPN with large regulation strength for alignment of the liquid crystal molecule is obtained.

In the embodiment, the liquid crystal display device may be formed without the protection plate 40. In the case, the sensing substrate 30 can be used so that the sensing substrate 30 may function also as the protection plate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device having a plurality of pixels, comprising:
   a first substrate including:
      a pair of source lines arranged in a first direction and extending in a second direction orthogonally crossing the first direction,
      a pair of gate lines arranged in the second direction and extending in the first direction,
      a pair of first main common electrodes formed on the source lines, respectively,
      first and second sub-common electrodes arranged on the pair of gate lines, respectively, the pair of first main common electrodes and the first and second sub-common electrodes forming a first frame-like common electrode, a main pixel electrode extending in the second direction and sandwiched by the pair of first main common electrodes, first and second sub-pixel electrodes electrically coupled with the main pixel electrode and extending in the first direction and on both sides sandwiching the main pixel electrode, a first alignment film formed on the main pixel electrode, the first and second sub-pixel electrodes, the first main common electrodes, and the first and second sub-common electrodes, and having vertical alignment characteristics, a second substrate including:

a pair of second main common electrodes arranged above and corresponding to the first main common electrodes, respectively, such that the pair of first main common electrodes and the pair of second main common electrodes are substantially mirroring each other across the liquid crystal layer, third and fourth sub-common electrodes arranged above the pair of gate lines, the second main common electrodes and the third and fourth sub-common electrodes forming a second frame-like common electrode, a second alignment film formed on the second main common electrodes and the third and fourth sub-common electrodes, and having vertical alignment characteristics, and a liquid crystal layer held between the first substrate and the second substrate and having positive dielectric anisotropy, wherein the main pixel electrode and the first and second sub-pixel electrodes form a cross shape and are surrounded by the first and second main common electrodes, and the first, second, third, and fourth sub-common electrodes, and the first and second frame-like common electrodes face each other.

2. The liquid crystal display device according to claim 1, wherein the sub-pixel electrodes are arranged in a central portion of the pixel and connected with the main pixel electrode extending in the first direction.

3. The liquid crystal display device according to claim 2, wherein an auxiliary capacitance line is arranged under the first and second sub-pixel electrodes.

4. A liquid crystal display device having a plurality of pixels, comprising:

a first substrate including:

a pair of source lines arranged in a first direction and extending in a second direction orthogonally crossing the first direction, a pair of gate lines arranged in the second direction and extending in the first direction, a pair of first main common electrodes formed on the source lines, respectively, first and second sub-common electrodes arranged on the pair of gate lines, respectively, the pair of first main common electrodes and the first and second sub-common electrodes forming a first frame-like common electrode, a main pixel electrode extending in the second direction and sandwiched by the pair of first main common electrodes, first and second sub-pixel electrodes electrically coupled with the main pixel electrode and extending in the first direction and on both sides sandwiching the main pixel electrode, a first alignment film formed on the main pixel electrode, the first and second sub-pixel electrodes, and the first and second sub-common electrodes, and having vertical alignment characteristics, a second substrate including:

a pair of second main common electrodes arranged above and corresponding to the first main common electrodes, respectively, such that the pair of first main common electrodes and the pair of second main common electrodes are substantially mirroring each other across the liquid crystal layer, third and fourth sub-common electrodes arranged above the pair of gate lines, the second main common electrodes and the third and fourth sub-common electrodes forming a second frame-like common electrode, a second alignment film formed on the second main common electrodes and the third and fourth sub-common electrodes, and having vertical alignment characteristics, and a liquid crystal layer held between the first substrate and the second substrate and having positive dielectric anisotropy, wherein the main pixel electrode and the first and second sub-pixel electrodes form a cross shape and are surrounded by the first and second main common electrodes, and the first, second, third and fourth sub-common electrodes, and the first and second frame-like common electrodes face each other, and a sensing substrate is arranged on an active area of the liquid crystal display panel to detect a position information inputted by applying pressure to the sensing substrate.

5. The liquid crystal display device according to claim 4, further comprising a protection plate arranged on the sensing substrate.

6. The liquid crystal display device according to claim 5, wherein the sensing substrate is attached to the liquid crystal display panel by resin adhesives, and the protection substrate is attached to the sensing substrate by resin adhesives.

7. The liquid crystal display device according to claim 6, wherein the resin adhesives have a refractive index between the refractive index of the sensing substrate and the refractive index of the protection plate.

8. The liquid crystal display device according to claim 4, wherein the liquid crystal molecule is aligned along an oblique electric field with respect to the first and second substrates.

* * * * *